(12) United States Patent
Fenton et al.

(10) Patent No.: US 6,415,942 B1
(45) Date of Patent: Jul. 9, 2002

(54) FILLER ASSEMBLY FOR AUTOMOBILE FUEL TANK

(76) Inventors: Ronald L. Fenton, 1749 Golf Rd., Mt. Prospect, IL (US) 60056; Wallace Shakun, 420 Jefferson Cir., Atlanta, GA (US) 30328

( * ) Notice: Subject to any disclaimer, the term of this patent is extended or adjusted under 35 U.S.C. 154(b) by 0 days.

(21) Appl. No.: 09/693,163

(22) Filed: Oct. 23, 2000

(51) Int. Cl.$^7$ ............................................... B65D 25/00
(52) U.S. Cl. ................... 220/563; 220/4.14; 220/560.1; 137/574
(58) Field of Search ................... 220/4.14, 560.01, 220/563, 4.13; 137/574, 576

(56) References Cited

U.S. PATENT DOCUMENTS

| 3,356,256 | A | | 12/1967 | Szego | |
|---|---|---|---|---|---|
| 3,426,937 | A | * | 2/1969 | Boschi et al. | 220/4.14 |
| 3,552,596 | A | * | 1/1971 | Landon | 220/4.14 |
| 4,149,649 | A | | 4/1979 | Szego | |
| 4,566,589 | A | | 1/1986 | Poschinger | |
| 4,613,054 | A | | 9/1986 | Schrenk | |
| 4,921,118 | A | | 5/1990 | Gass | |
| 4,925,053 | A | | 5/1990 | Fenton et al. | |
| 4,927,045 | A | | 5/1990 | Lichka | |
| 4,988,011 | A | | 1/1991 | Fenton et al. | |
| 5,000,236 | A | | 3/1991 | Jemison | |
| 5,000,336 | A | | 3/1991 | Gass | |
| 5,163,573 | A | | 11/1992 | Kang | |
| 5,500,037 | A | | 3/1996 | Alhamad | |
| 5,540,285 | A | | 7/1996 | Alhamad | |
| 5,576,511 | A | | 11/1996 | Alhamad | |
| 5,738,175 | A | | 4/1998 | Alhamad | |
| 5,749,485 | A | * | 5/1998 | Chiu | 220/4.14 |
| 6,105,676 | A | | 8/2000 | Alhamad | |

* cited by examiner

Primary Examiner—Joseph M. Moy
(74) Attorney, Agent, or Firm—Douglas B. White

(57) ABSTRACT

The fuel tank assembly for an automobile comprises a substantially box-shaped bottom portion having a top peripheral flange; several highly porous filler packets or blocks made from metal foil mesh material received in the tank, each packet being formed from two to ten layers of metal foil mesh material, and some of said packets being folded over, thereby to substantially fill the tank with the highly porous packets or blocks, and a top tank cover plate sealed to the top peripheral flange. The method for constructing an anti-fuel-splashing and anti-rupturing automobile fuel tank comprises the steps of: providing a generally box-shaped fuel tank bottom portion having a top peripheral flange; providing in the tank a generally trough or cage shaped enclosure surrounding an inlet to the fuel tank; providing a plurality of packets or blocks, some of which are foldable, and which are made of two to ten layers of a metal foil mesh material; and, inserting the packets or blocks into the fuel tank to substantially fill said fuel tank with said packets or blocks made of layers of metal foil mesh material and sealing a cover plate to the top peripheral flange to complete construction of the fuel tank.

17 Claims, 5 Drawing Sheets

FILLER ASSEMBLY FOR AUTOMOBILE FUEL TANK

BACKGROUND OF THE INVENTION

1. Field of the Invention

The present invention relates to a filler assembly for an automobile fuel tank where the filler assembly includes packets or blocks made of layers of folded or unfolded sheets of metal foil mesh which are inserted into a fuel tank for dissipating heat and for minimizing sloshing of fuel when the fuel tank is subjected to an impact sufficient to crush a portion of the fuel tank.

2. Description of the Prior Art

It is well known that fuel tanks that are mounted in the rear of an automobile and beneath a portion of a back seat and within a portion of or below a trunk compartment of the automobile often are distorted, ruptured, or partially crushed upon impact by another vehicle in a rear-end collision. In such a rear-end collision, the impact ruptures the fuel tank and fuel is caused to splash or slosh around and move forwardly into the rear seat compartment and even further forward. Oftentimes, a spark or heat generated from the impact will ignite the fuel causing burning and explosion of the vehicle and resulting in extreme injury, and even death, to passengers in the vehicle.

The filler assembly of the present invention and the construction of the fuel tank incorporating such filler assembly has as its goal to prevent splashing and sloshing of fuel upon a rear collision impact. The filler assembly is made of sheets of mesh foil which substantially fill the fuel tank and which dissipate any heat generated upon an impact on the fuel tank.

Fuel tanks when subjected to collisions, have a tendency to explode and/or when crushed from the force of an impact, to open up in such a way that fuel is splashed or spewed up and out of the tank so that any source of ignition (from a spark, heat, raised temperature, etc.) causes the fuel to ignite outside of the fuel tank causing extreme injury or death to passengers.

Automobile companies in a series of rear end collision deaths of fuel tanks showed that the top of some fuel tanks are pried open by the impact and a "Teepee" is created in the middle causing the fuel to splash out of the exposed top and sides of the fuel tank splashing forward and igniting, resulting in severe injury to occupants of the vehicle.

Heretofore it has been proposed to insert a sheet of metal foil and perforated sheets of metal foil folded and unfolded into a receptacle of combustible materials such as a fuel tank. Examples of previously proposed analogous and non-analogous filler materials are set forth in the following analogous and non-analogous U.S. patents:

| U.S. Pat. No. | Patentee |
| --- | --- |
| 3,356,256 | Szego |
| 4,149,649 | Szego |
| 4,566,589 | Poschinger |
| 4,613,054 | Schrenk |
| 4,921,118 | Gass |
| 4,927,045 | Lichka |
| 4,925,053 | Fenton, et al. |
| 4,988,011 | Fenton, et al. |
| 5,000,236 | Jemison |
| 5,000,336 | Gass |

-continued

| U.S. Pat. No. | Patentee |
| --- | --- |
| 5,163,573 | Kang |
| 5,500,037 | Alhamad |
| 5,540,285 | Alhamad |
| 5,576,511 | Alhamad |
| 5,738,175 | Alhamad |
| 6,105,676 | Alhamad |

SUMMARY OF THE INVENTION

According to the present invention, there is provided a fuel tank assembly for an automobile comprising a substantially box-shaped bottom portion having a top peripheral flange; several highly porous filler packets or blocks made from metal foil mesh material received in the tank, each packet being formed from one to ten layers of metal foil mesh material, and some of said packets being folded over, thereby to substantially fill the tank with the highly porous packets or blocks, and a top tank cover plate sealed to the top peripheral flange.

Further according to the present invention there is provided a method for constructing an anti-fuel-splashing and anti-rupturing automobile fuel tank comprising the steps of: providing a generally box-shaped fuel tank bottom portion having a top peripheral flange; providing in the tank a generally trough or cage shaped enclosure surrounding an inlet to the fuel tank; providing a plurality of packets or blocks, some of which are foldable, and which are made of two to ten layers of a metal foil mesh material; and, inserting the packets or blocks into the fuel tank to substantially fill said fuel tank with said packets or blocks made of layers of metal foil mesh material and sealing a cover plate to the top peripheral flange to complete construction of the fuel tank.

DESCRIPTION OF THE PREFERRED EMBODIMENT(S)

Figure 1:
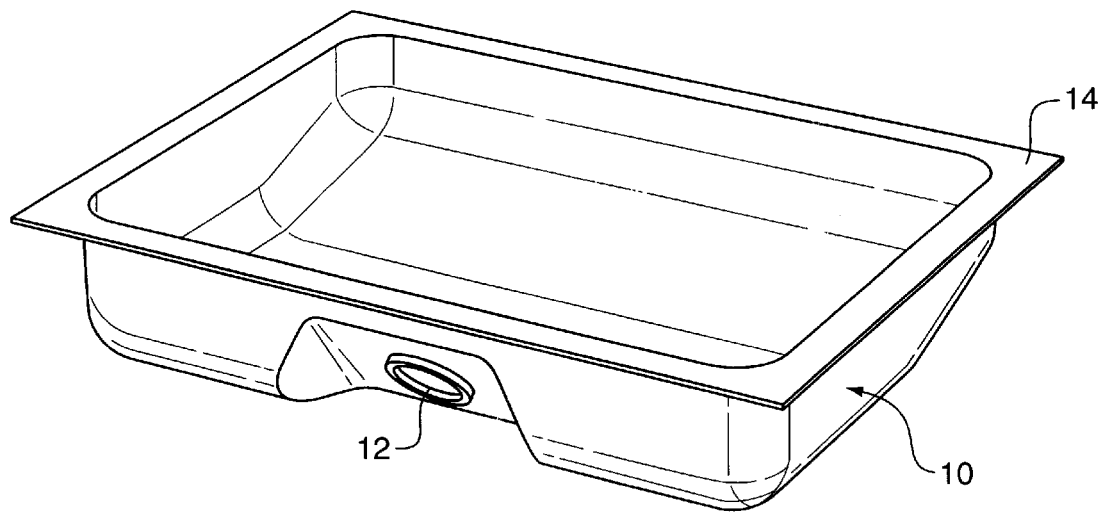
FIG. 1 is a rear perspective view of a bottom portion of a fuel tank which is mounted in the area beneath and between a rear seat in an automobile and a trunk compartment of the automobile.

Referring now to the drawings in greater detail, there is disclosed in FIG. 1 a fuel tank bottom portion 10 (hereinafter simply the fuel tank 10) having an inlet opening 12 and a top peripheral flange 14.

Figure 2:
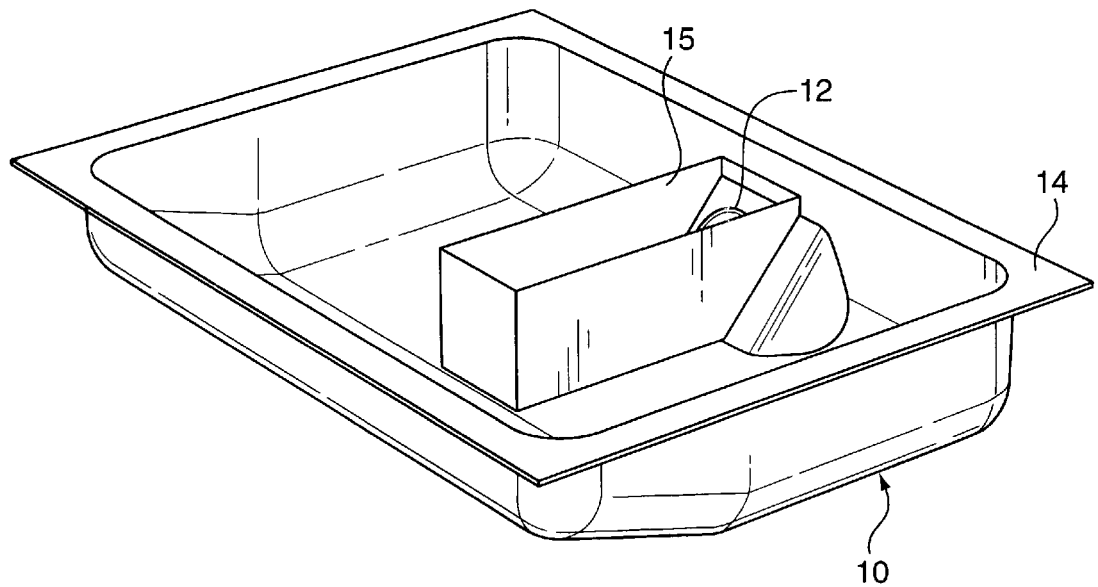
FIG. 2 is a front and side perspective side view of the bottom portion of the fuel tank shown in FIG. 1 and shows a rectangular box shaped trough or cage for receiving a float of a fuel gauge.

As shown in FIG. 2, when the fuel tank 10 is turned around, the opening 12 faces rearwardly for connection to a hose leading to the fuel inlet on the side of the automobile and such opening is surrounded by a generally rectangular or box shaped trough or cage 15 for receiving a float of a fuel gauge and a fuel outlet tube.

Figure 3:
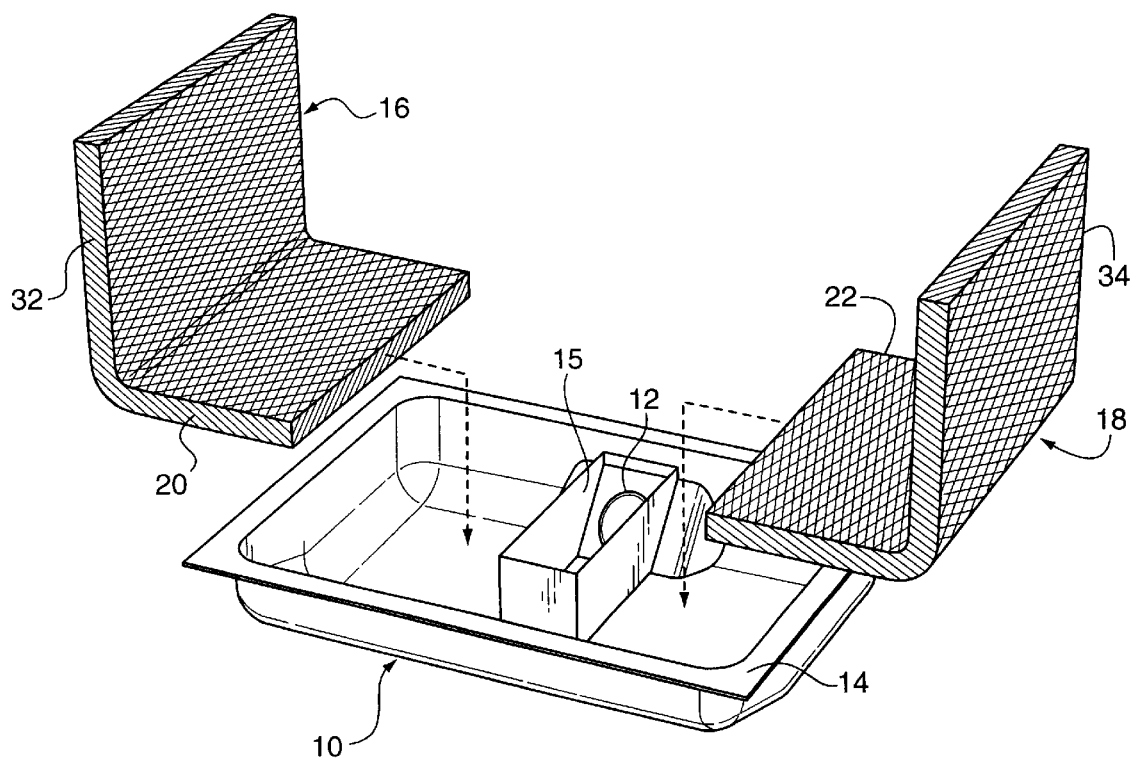
FIG. 3 is a front perspective view of the fuel tank shown in FIG. 2 showing two elongate filler packets made of metal foil mesh material which are inserted into opposite sides of the tank bottom portion on each side of the trough or cage.

Referring now to FIG. 3, first and second elongate, generally rectangular filler packets 16 and 18 each made of two to ten layers of metal, e.g., aluminum, foil mesh material are folded so as to form a bottom portion 20 or 22 which is inserted into one side 24 or 26 of the tank 10 on each side of the trough or cage 14.

Figure 4:
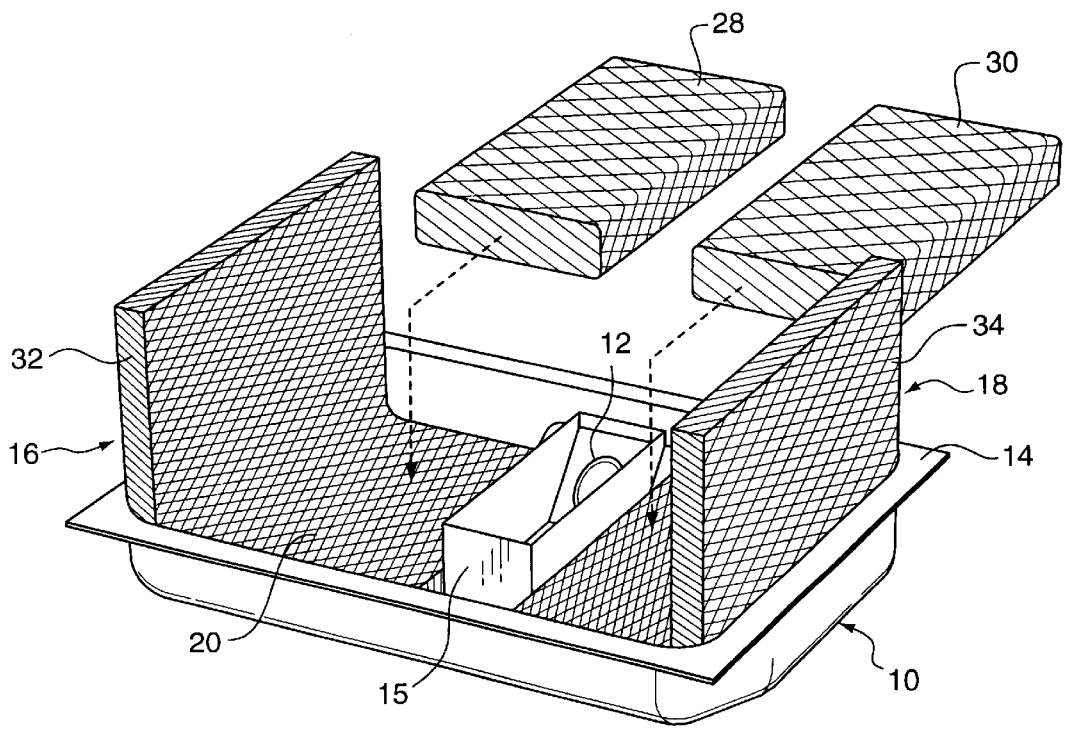
FIG. 4 is a front perspective view of the open fuel tank shown in FIG. 3 and shows two rectangular metal foil mesh blocks which are made with a larger mesh material and which are inserted over the partially folded elongate filler packets.

Then, as shown in FIG. 4, two rectangular blocks 28 and 30, each made of several layers of metal foil mesh material having a larger mesh size then the layers of metal foil mesh material from which the filler packets 16 and 18 are made, are inserted over one of the bottom portions 20 or 22.

Figure 5:
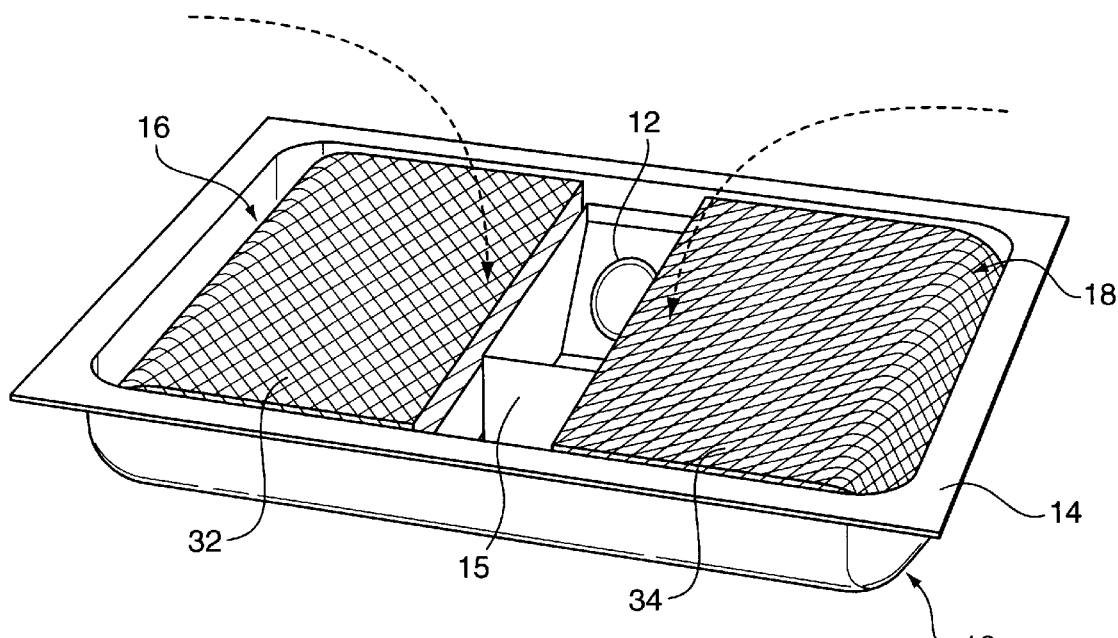
FIG. 5 is a perspective view of the open fuel tank shown in FIG. 4 and shows the elongate filler packets folded over.
Figure 6:
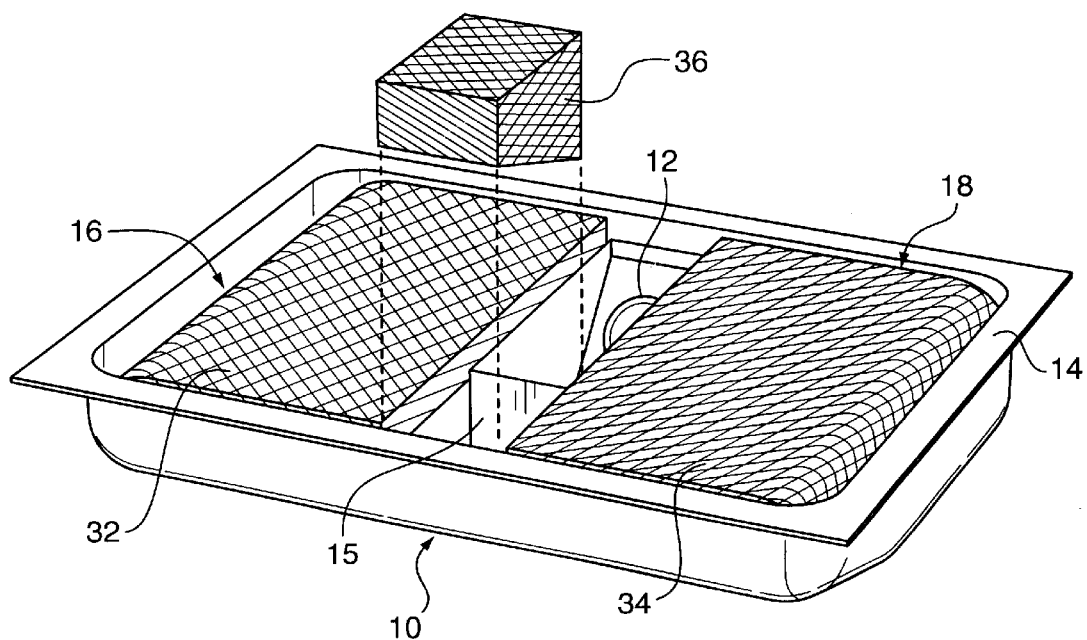
FIG. 6 shows a generally trapezoidal block of metal foil mesh material which is inserted into the remaining open space in the fuel tank bottom portion.
Figure 7:
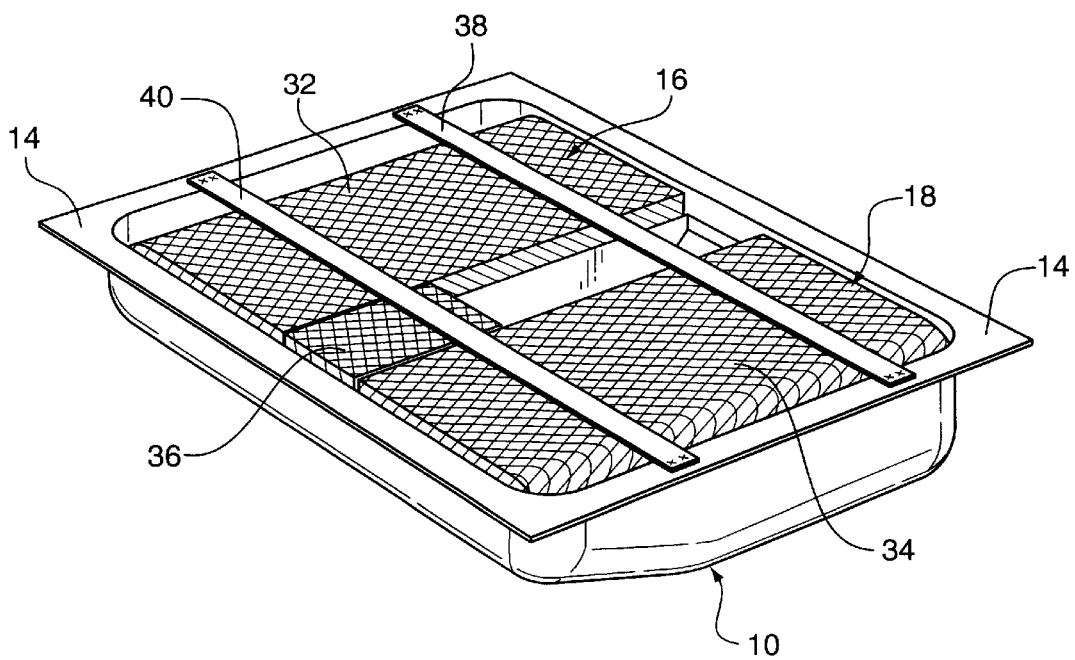
FIG. 7 shows at least two reinforcing bars extending laterally from side to side of the fuel tank across the open top of the fuel tank bottom portion.
Figure 8:
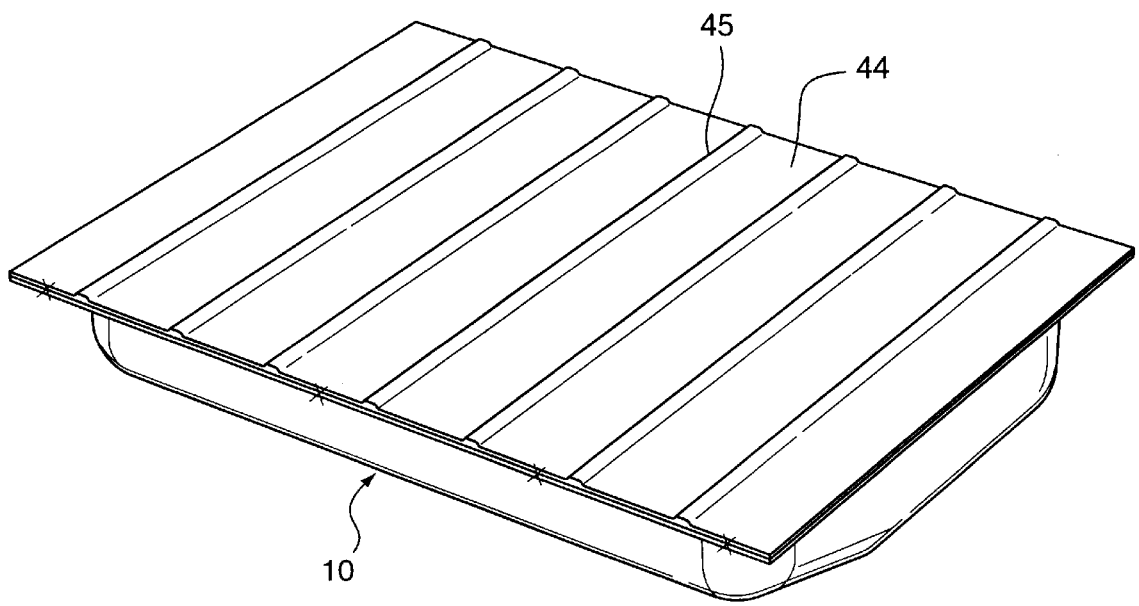
FIG. 8 is a perspective view of the fuel tank shown in FIG. 7 but with a top cover plate welded to a top peripheral flange of the fuel tank bottom portion shown in FIG. 7.

Then, an upper portion 32 or 34 of each filler packet is folded over the generally rectangular blocks 28 and 30, as shown in FIG. 5.

Next, an odd shaped or generally trapezoidal shaped block 36, which can be made of the larger mesh metal foil mesh from which the rectangular packets 16 and 18 are made, is inserted into the remaining space in the fuel tank 10. The block 36 has a shape conforming to the space between the tank bottom portion 10 and the trough or cage 14.

To reinforce the fuel tank 10, at least two bars 38 and 40 are fixed across the fuel tank 10, extending from side to side and fixed to the top peripheral flange 14 of the tank bottom portion 10.

Finally, a cover plate 44 with reinforcing ribs 45 extending from front to rear of the tank 10 is secured completely around and to the top peripheral flange 14 by brazing or welding.

Figure 9:
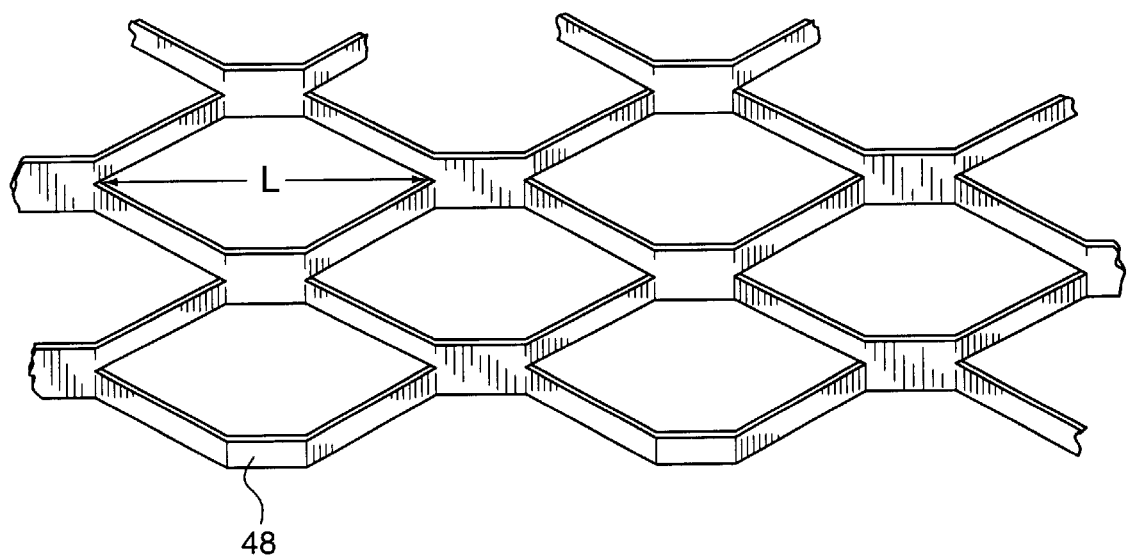
FIG. 9 is a perspective view of a portion of a sheet of metal foil mesh material from which the foldable packets, the rectangular blocks and the generally trapezoidal block are constructed.

The filler packets 16 and 18, the rectangular blocks 28 and 30 and the odd shaped block 36 are made from 2 to 10, preferably 5, sheets of metal foil mesh material, a portion 48 of which is shown in FIG. 9. This metal foil mesh material can be of the type disclosed in the Fenton et al. U.S. Pat. Nos. 4,925,053 and 4,988,011.

As shown in FIG. 9 the mesh has a longest dimension L. The filler packets 16 and 18 preferably are made of a small mesh where L is 1/16 inch to 1/4 inch, and preferably 1/8 inch. A larger size mesh has an L dimension of 1/4 inch to 3/8 inch and this size metal foil mesh is used to construct the rectangular blocks 28 and 30 and the odd shaped block 36.

We claim:

1. A fuel tank assembly for an automobile which includes a fuel tank, which is constructed to minimize, if not prevent, splashing or sloshing of fuel out of the tank if the fuel tank should rupture in a collision with another object and which comprises a substantially box-shaped bottom portion having a top peripheral flange; several highly porous, anti-splash, filler packets made from metal foil mesh material received in said tank, each packet being formed from two to ten layers of metal foil mesh material, and some of said packets being folded over, thereby to substantially fill the tank with said highly porous packets to inhibit, if not prevent, fuel from splashing or sloshing out of the tank upon a rupture of the tank, and a top tank cover plate sealed to the top peripheral flange.

2. The fuel tank of claim 1 wherein said fuel tank is separated into two side spaces by a generally rectangular or box shaped cage for receiving a float of a fuel gauge and a fuel inlet tube into which an inlet for the fuel tank opens, and filler packets are placed into said side spaces.

3. The fuel tank of claim 2 wherein said filler packets further include an odd shaped packet sized to fit into the space between a rear wall of said tank bottom portion and said trough or cage.

4. The fuel tank of claim 2 wherein said filler packets include two elongate packets each having a bottom portion, an intermediate portion and a top portion and said bottom portion of each rectangular packet being placed in the bottom of said fuel tank on one side of said trough or cage.

5. The fuel tank of claim 4 wherein said upper portions of said packets are folded downwardly over said bottom portion.

6. The fuel tank of claim 4 further comprising two generally rectangular packets made of metal foil mesh material and each having approximately the same size as said bottom portion of said elongate rectangular packet and each rectangular packet being placed on one of said bottom portions after which said top portion of each elongate rectangular packet is folded down over one of said rectangular packets.

7. The method of claim 6 wherein said generally rectangular packets are made of a larger mesh metal foil mesh material than said elongate generally rectangular packets.

8. The fuel tank of claim 6 wherein said filler packets further include an odd shaped packet sized to fit into the space between a rear wall of said tank bottom portion and said trough or cage.

9. The fuel tank of claim 8 wherein at least two metal bars are secured across the fuel tank extending from side to side to reinforce the fuel tank thereby to inhibit buckling of the fuel tank on impact from a rear end collision by another vehicle.

10. The fuel tank of claim 1 wherein at least two metal bars are secured across the fuel tank extending from side to side to reinforce the fuel tank thereby to inhibit buckling of the fuel tank on impact from a rear end collision by another vehicle.

11. A method for constructing an anti-fuel-splashing and anti-rupturing automobile fuel tank comprising the steps of:
   providing a generally box-shaped fuel tank bottom portion having a top peripheral flange;
   providing in the tank a generally trough or cage shaped enclosure surrounding an inlet to said fuel tank;
   providing a plurality of packets, some of which are foldable, and which are made of two to ten layers of a metal foil mesh material; and,
   inserting the packets into the fuel tank to substantially fill said fuel tank with said packets made of layers of metal foil mesh material and sealing a cover plate to said top peripheral flange to complete construction of said fuel tank.

12. The method of claim 11 wherein said packets comprise at least two generally rectangular elongate foldable packets each comprising a bottom portion, an intermediate portion and a top portion; and said method further comprises the steps of:
   inserting each bottom portion into one side of said fuel tank and folding over said top portion above said bottom portion to substantially fill said one side of the fuel tank with packet of metal foil mesh material.

13. The method of claim 11 wherein said packets comprise at least two generally rectangular elongate foldable packets each comprising a bottom portion, an intermediate portion and a top portion; and said method further comprises the steps of:

inserting each bottom portion into one side of said fuel tank;

providing two generally rectangular packets made of metal foil mesh material;

placing each rectangular packet of metal foil mesh material on one of said bottom portions of one of said generally elongate rectangular packets; and, folding said top portion of each generally rectangular filler packet over one of said generally rectangular packets.

14. The method of claim 13 wherein said generally rectangular packets are made of a larger mesh metal foil mesh material than said elongate generally rectangular packets.

15. The method of claim 14 wherein said two packets are made of metal foil mesh material which has a mesh dimension L across the widest portion of the mesh of 1/16 inch to 1/8 inch and other blocks have a dimension L of between 1/4 inch and 3/8 inch.

16. The method of claim 13 further comprising the steps of:

welding at least two metal bars across said fuel tank from side to side of said fuel tank to provide reinforcement against buckling of said fuel tank and to resist creating a "Teepee" of said tank top cover plate when said fuel tank is subjected to an impact from a rear end collision.

17. The fuel tank assembly of claim 1 where said anti-splash filler packets are made from metal foil mesh having a mesh dimension L across the widest portion of the mesh of 1/16 inch to 1/8 inch.

* * * * *